Feb. 5, 1963 K. A. KLINGLER 3,076,667
STEAM CONDUIT JOINT STRUCTURE
Filed June 23, 1958 2 Sheets-Sheet 2

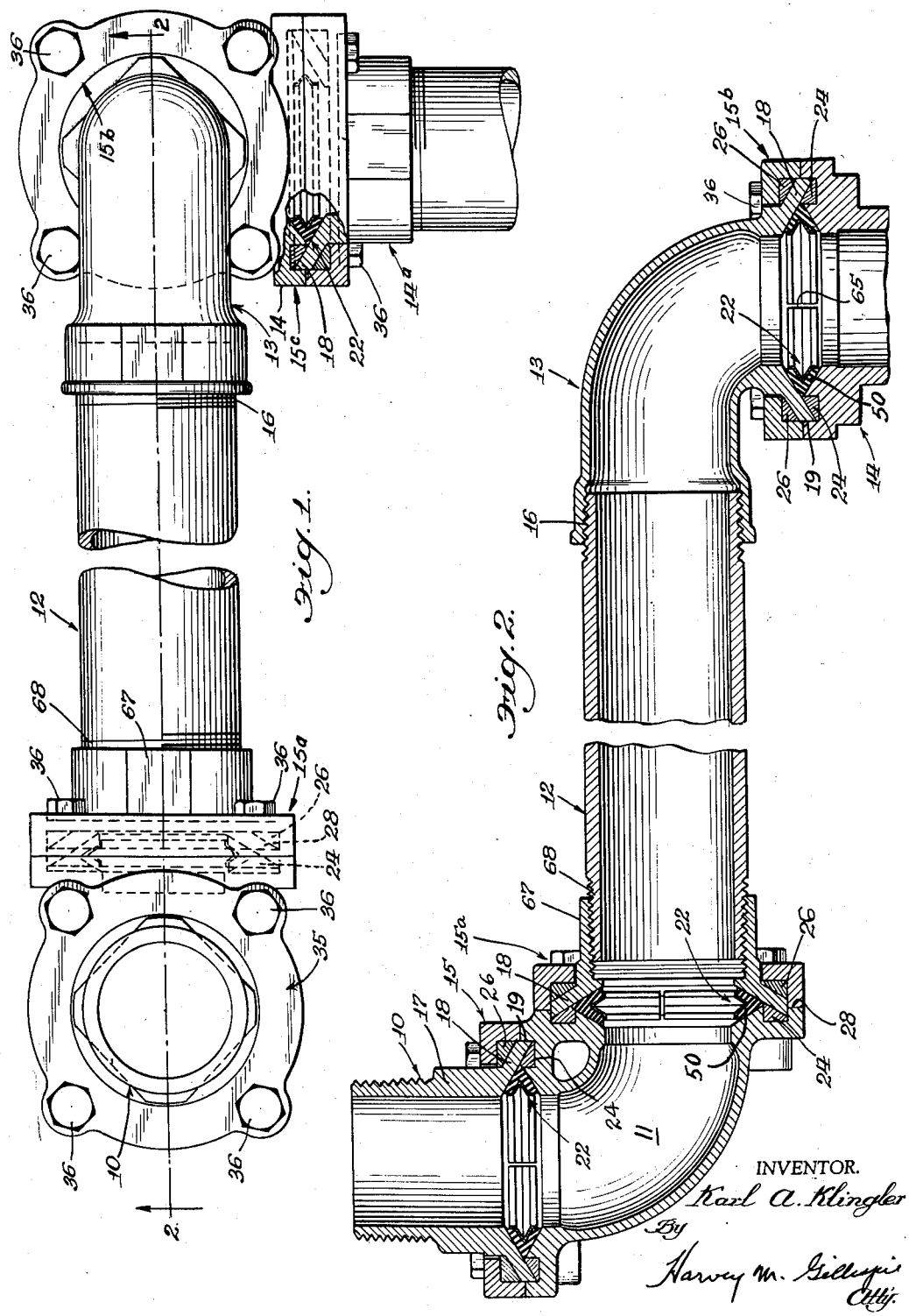

INVENTOR.
Karl A. Klingler
BY
Harvey M. Gillespie
Atty.

United States Patent Office 3,076,667
Patented Feb. 5, 1963

3,076,667
STEAM CONDUIT JOINT STRUCTURE
Karl A. Klingler, Naperville, Ill., assignor to Vapor Heating Corporation, Chicago, Ill., a corporation of Delaware
Filed June 23, 1958, Ser. No. 743,599
6 Claims. (Cl. 285—98)

The present invention relates to improvements in flexible metallic conduits for connecting together the train pipes of adjacent railway cars.

Prior to the present invention, the flexible metallic conduits for connecting together railway car train pipes, for example steam train pipes, have not been entirely satisfactory since they have usually included two telescopically arranged castings, one being an elbow supported in an external bearing and having revolvable contact with the cylindrical inner wall of the other casting. Such an arrangement makes for rapid wear of the said bearing and of the co-engaging surfaces of the joint members, and consequently permits the joint members to move out of axial alignment. Under such conditions, it is difficult to maintain a steam-tight joint, particularly since a sleeve or ring type of gasket must be employed to seal the telescoped joint members. In such case, the sleeve or ring gasket engages the inner cylindrical wall of the outer joint member and is pressed by means of a helical spring against an end surface of the inner joint member. Inasmuch as the sealing area of said end surfaces is limited to the thickness of the end of the inner joint member, the effective life of the gasket is relatively short.

It has been also proposed heretofore, to connect joint members of various forms in end-to-end arrangement and to seal the joint assembly by interposing between the adjacent end faces thereof gaskets of triangular and other cross-sections. However, these proposed joint assemblies have been unsatisfactory, since they, like the telescoping cylinder type of joint, are subject to excessive wear because of the constant pulling and jerking imposed thereon as a result of the abrupt opposing movements of the connected railway cars. As a consequence of such wear and the said pulling and jerking forces imposed on the joints, the joint elements move out of alignment and the gaskets therefore become pinched and otherwise so distorted as to seriously impair their sealing function.

The present invention is designed to overcome the above noted and other incidental limitations that are attendant upon the construction and use of conventional metallic conduit connections between railway cars and, toward this end, it contemplates a joint structure in which the sealing gasket is so constructed as to provide sealing surfaces of large area and in which the relatively movable parts are self aligning and thereby avoid pinching or otherwise distorting the sealing gasket. In this connection the joint is so constructed that one of the relatively movable elements is movably connected to a frusto-conical thrust flange by means of thrust rings, one or more of which are wedge-shaped in cross-section and bear against a cooperating conical surface of the said thrust flange, whereby the fluid pressures within the joint assembly maintain the opposing ends of the relatively movable elements of the joint in axial alignment. Furthermore, the thrust rings are made of one of the known corrosion resistant materials, for example comminuted particles of stainless steel or brass sintered together and impregnated with a solid lubricant so that the parts of the joint are maintained freely movable at all times without the use of the more expensive roller or ball bearings and wherein the thrust bearings per se function as sealing elements.

In the accompanying drawings forming a part of this specification two illustrative embodiments of the invention have been shown.

In these drawings:

FIG. 1 is a fragmentary top plan view of a portion of a flexible conduit connection between the end valves of an adjacent pair of railway cars, the illustrated portion involving five conduit structure units, of which two pairs thereof are operatively swivelly connected together by a flexible joint constructed in accordance with the principles of the present invention;

FIG. 2 is a sectional view taken substantially along the line 2—2 of FIG. 1;

Figure 3:
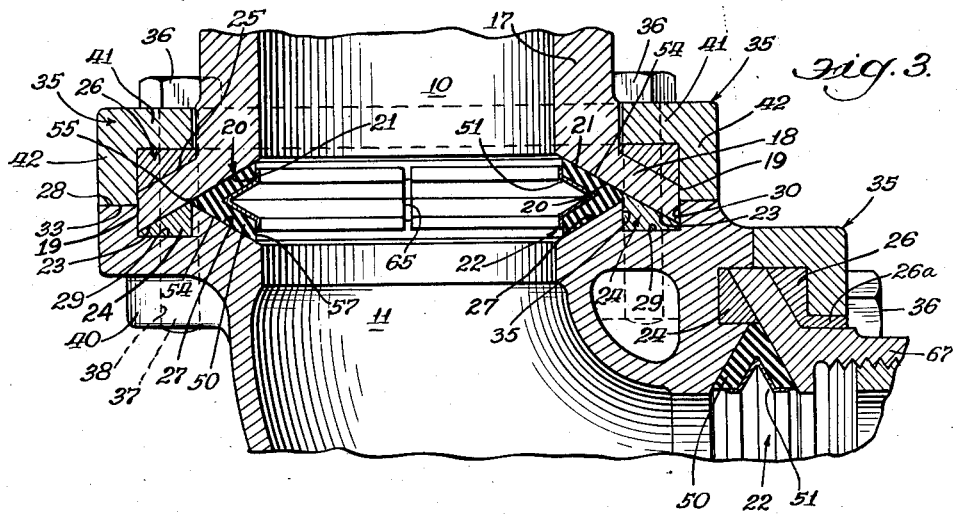
FIG. 3 is an enlarged fragmentary sectional view representing an enlargement of a portion of the structure shown in FIG. 2 in the vicinity of one of the flexible joints.

Referring now to the drawings in detail and in particular to FIGS. 1 and 2 wherein a portion of a train line connection between the end valves at adjacent ends of two interconnected railway cars has been illustrated, the illustrated portion includes five interconnected metallic conduit sections, 10, 11, 12, 13, 14 and 17. The section 10 (FIG. 2) constitutes an upper supporting section adapted to be threadedly received in a threaded opening provided for it in an end valve (not shown) of one of the railway cars. The section 11 (FIG. 2) is in the form of an upper elbow piece or joint member. The section 12 is a straight pipe section. The section 13 is in the form of a lower elbow piece or joint member adapted to be operatively and communicatively connected to another straight pipe section similar to the section 12. The portion of the train line connection illustrated herein constitutes approximately one-half of the complete train line connection and it will be understood that the omitted portion will be substantially identical with the illustrated portion.

The conduit sections 10 and 11 are operatively and swivelly connected together in sealed communicating relationship by one of the flexible joint assemblies of the present invention, the assembly being designated in its entirety at 15. The sections 11 and 12 are similarly connected together by a like flexible joint assembly designated 15ª. The sections 12 and 13 are fixedly attached together by a conventional threaded connection 16. The sections 13 and 14 are swivelly and communicatively connected together by a third flexible joint assembly designated 15ᵇ and the sections 14 and 14ª, the latter being shown only in FIG. 1, are revolvably attached together by a fourth flexible joint assembly 15ᶜ (shown only in FIG. 1). The four flexible joint assemblies 15, 15ª, 15ᵇ and 15ᶜ illustrated herein are identical in construction although the environment therefore differs slightly and it is thought that a description of one of them will suffice for the others. The environment of the joints 15 between the sections 10 and 11 and between the sections 13 and 14 are truly identical, while the environment of the joint 15ª between the sections 11 and 12 differs slightly in that a certain sealing surface associated with the joint is provided on a separate element instead of being provided directly on one of the conduit sections, as will be described subsequently.

Referring now to the flexible swivel joint which exists between the two conduit sections 10 and 11, as shown in FIGS. 1, 2 and 3. This joint is created by the special shaping of the two adjacent ends of the sections 11 and 12 and by the use of certain novel sealing, thrust-assimilating and clamping elements respectively, the nature of which will be set forth in detail presently.

The non-threaded end 17 of the section 10 is formed with a downwardly and outwardly inclined circumferential thrust flange 18 presenting a cylindrical outer peripheral surface 19. The lower end or rim of the conduit section 10, including the inside face of the flange 18, presents a continuous frusto-conical surface 20, the inner region 21 of which constitutes a running seal surface for frictional sealing engagement with a surface on a composite sealing ring assembly 22, the nature and function of which will be set forth presently. The outer region 23 of the frusto-conical surface 20 constitutes a thrust or bearing surface designed for cooperation with a thrust ring 24, the nature and function of which likewise will be made clear presently. The outside surface 25 of the flange 18 constitutes a thrust or bearing surface designed for cooperation with a thrust ring 26 which functions in a manner similar to the thrust ring 24.

The upwardly presented end or rim of the elbow conduit section 11 presents a frusto-conical surface 27 designed for running frictional sealing engagement with a surface on the composite sealing ring assembly 22. Outside of the frusto-conical surface 27, the rim of the section 11 is provided with an upwardly facing flat annular end surface 28 which is separated from the surface 27 by an annular groove having a horizontal bottom wall 29 and upstanding side walls 30 and 31. The end surface 28 is adapted to receive thereagainst the downwardly facing rim 33 of a cup-shaped clamping ring 35. A series of four clamping bolts 36 extend through the clamping ring 35 and have their shank portions 37 threadedly received as at 38 in respective thickened rib portions 40 formed on the outside surface of the elbow section 11.

As best seen in FIG. 3, the thrust ring 24 is generally wedge shape in cross-section and this ring is seated upon the annular bottom wall 29 of the groove surrounding the frusto-conical sealing surface 27 with the ring filling the bottom regions of the groove and having thrust bearing against the outer marginal portion 23 of the frusto-conical surface 20 of the flange 18. The cylindrical outer surface 19 of the flared flange 18 is telescopically received within the cylindrical side wall 30 of the groove while the thrust ring 26, which likewise is generally of wedge shape in cross-section fits upon the upper inclined surface 25 of the flange 18. The clamping ring 35 is L-shaped in radial cross-section and the flat horizontal portion 41 thereof engages the upper face of the thrust ring 26. The cylindrical portion 42 of the clamping ring 35 encompasses the ring 26 and a limited portion of the cylindrical surface 19 on the flared flange 18. From the above description it will be seen that when the parts are assembled and tightened by the clamping bolts 36, the outwardly flared thrust flange 18 is firmly yet slidably clamped between the two thrust rings 24 and 26. Relative rotation between the flange and thrust rings is enhanced by the character of the material from which the rings are formed, such material preferably being of comminuted stainless-steel, brass or other non-corrosion metal sintered together and impregnated with a solid lubricant such as graphite. When the clamping bolts 36 are tightened and the surface 33 of the clamping ring 35 is drawn against the annular clamping surface 28 on the conduit section 11, the conduit section 10 will be securely held against relative tilting movement, i.e. axial misalignment relative to the joint, while at the same time relative rotation between the conduit sections 10 and 11 will be made possible. Stated in other words, the annular enclosure which is formed by virtue of the inside surfaces of the clamping ring 35 and the surfaces 29, 30 and 31 of the annular groove surrounding the frusto-conical surface 27, constitutes in effect a bearing chamber into which the outer peripheral region 23 of the outwardly flared flange 18 extends while the thrust rings 24 and 26, in addition to performing their function of assimilating endwise thrust of the flange 18, also function as antifriction bearing members which serve to self-center the joint elements 10 and 11, whereby the lower end region of the conduit section 10 is rotatably journalled in the upper end region of the conduit section 11.

Although the composite sealing ring assembly 22 is of novel design, no claim is made herein to any novelty per se associated with the same, the novelty in the details of the ring being set forth and claimed in my copending application Serial No. 743,678, filed June 23, 1958, for Gasket.

Figure 4:
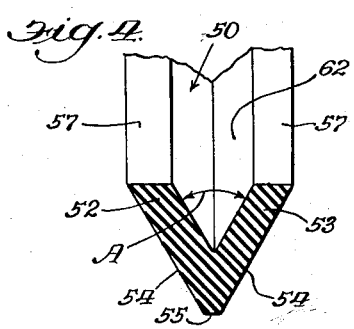
FIG. 4 is a fragmentary inside perspective view, partly in radial section, of a sealing ring employed in connection with the present invention.
Figure 5:
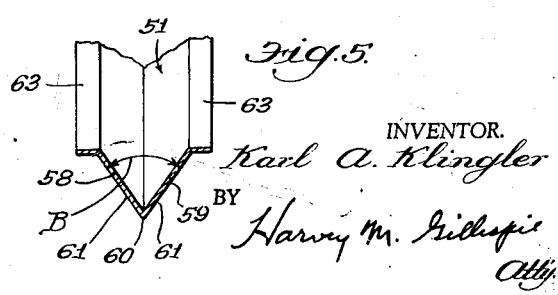
FIG. 5 is a fragmentary inside perspective view, partly in radial section, of a sealing ring expanding, reinforcing and shielding element employed in connection with the invention.

Referring now to FIGS. 3, 4 and 5 wherein the details of the sealing ring assembly 22 are best illustrated, the assembly is comprised of two parts, namely a continuous elastomeric sealing ring proper 50, and a resilient metallic split armor and reinforcement ring 51 which preferably is formed of stainless steel.

The elastomeric ring may be formed of rubber, either natural or synthetic, or of a suitable rubber substitute. It is of V-shaped in radial cross-section and is thus formed with two adjacent diverging side walls 52 and 53, each presenting a frusto-conical outer sealing face 54 of large area. The side walls 52 and 53 diverge radially inwardly of the gasket structure as a whole and are joined at the outer rim regions of the ring and present a blunt cylindrical apex surface 55. The angle of divergence "A" of the side walls 52 and 53 is preferably in the neighborhood of 60° although larger and smaller angles of divergence within practicable limits are contemplated. The inner edges 57 of the side walls 52 and 53 are cylindrical and these two edges lie on the surface of a common imaginary cylinder.

The steel armor and reinforcing ring 51 is generally of V-shape in radial cross-section and comprises two side walls 58 and 59 which diverge radially inwardly of the ring. The two legs 58 and 59 join at an apex region 60 which presents a relatively sharp circumferential or peripheral edge. The outer faces 61 of the legs 58 and 59 are adapted to fit snugly within the V-shaped channel 62 which exists on the inside of the ring 50 and the inner edges of the divergent sides 58 and 59 are formed with lateral flanges 63 which abut against the end surfaces or edges 57 of the ring 50. The angle of divergence "B" between the side walls 58 and 59 is slightly greater than the angle of divergence "A" between the side walls 52 and 53 of the sealing ring 50 and thus, when the split ring is nested within the channel 62 on the inside of the ring 50, the side walls 52 and 53 will be spread apart a slight distance so that they will assume the angle of divergence of the walls 58 and 59. In the illustrated form of the composite sealing ring assembly, the angle of divergence between the side walls 58 and 59 is on the order of 70°.

Referring now to FIG. 3, it will be observed that with the various parts assembled, the downwardly diverging flared flange 18 is, as previously described, maintained against axial thrust by the two thrust rings 24 and 26 while the opposed frusto-conical surfaces 21 and 20 are maintained slightly spaced from and at an angle of approximately 70° from each other. In other words, the inner portions of the two conduit sections 10 and 11 do not touch each other while the outer rim portions thereof are in contact only along the cylindrical surfaces 19 and 30. The radial cross sectional plane of the surface 27 intersects the radial cross sectional plane of the frusto-conical surface 20 medially of the latter and the blunt nose or peripheral edge 55 of the elastomeric ring 50 projects into the annular space existing between the frusto-conical surface 20 of the flange 18 and the rim of the wall 31 of the annular groove surrounding the sealing surface 27 and bears against the inside face of the thrust ring 24. By this arrangement, it will be observed, both thrust rings 24 and 26 bear against opposite marginal areas of the flange 18 located radially outwardly from the vertical plane of the apex 53 of the sealing ring 50. The outer surfaces 54 of the side walls 52 and 53 of the sealing ring 50 (FIGS. 3 and 4) bear against the two frusto-conical surface 27 and the inner marginal surface 21 of the frusto-conical surface 20 and the sealing effect attained is a result of the spreading action of the reinforcement ring 51 as enhanced by the outward expanding pressure exerted by the steam or other fluid passing through the joint.

As shown in FIG. 3 at 65, the split ends of the reinforcing and spreading ring 51 assume a slightly separated relation in the assembly. Thus the ring 51 serves the plural functions of first, spreading the elastomeric sealing ring 50 circumferentially and radially; secondly, of spreading the ring 50 longitudinally or axially by increasing the angle of divergence of the legs 52 and 53; and thirdly, of affording a protective shield on the inside of the ring 50 against contact of the ring with the fluid passing through the joint.

Figure 6:
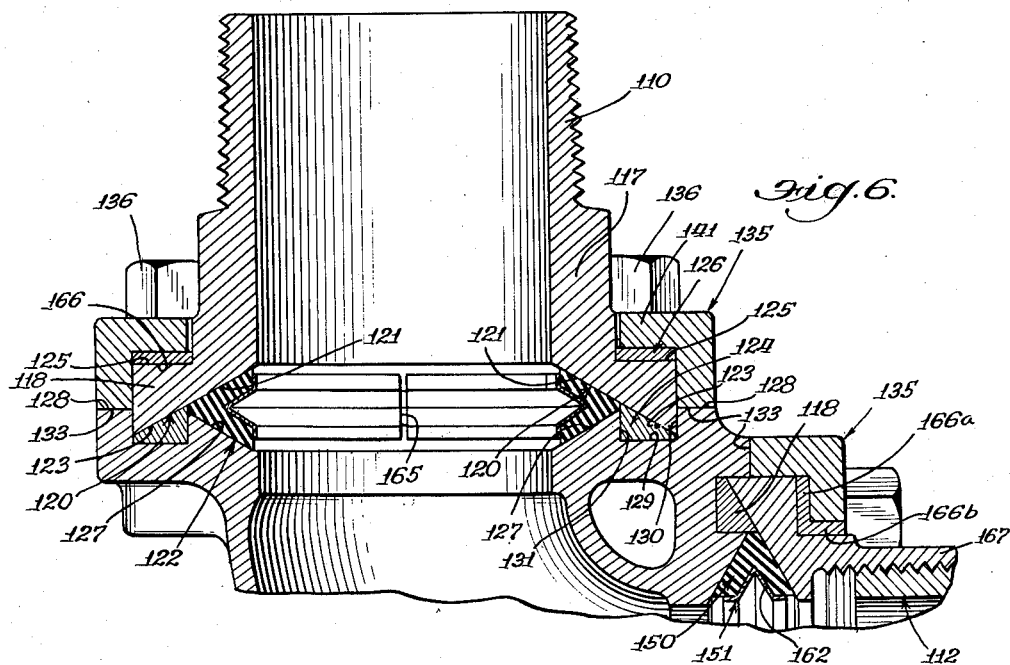
FIG. 6 is a sectional view, similar to FIG. 5, showing a modified form of the invention.

In FIG. 6 a slightly modified form of flexible joint constructed in accordance with the principles of the present invention has been shown. In this form of the invention the environment for the joint is identical with the environment shown in FIG. 3 and, additionally, the details of the composite sealing ring assembly and of the lower thrust ring remain substantially the same as in the previously described form of the joint. Thus, to avoid needless repetition of description, similar reference numerals of a higher order have been applied to the parts shown in FIG. 6 corresponding to those shown in FIGS. 1 to 3 inclusive.

In FIG. 6, the downwardly and outwardly diverging circumferential flange 118 is formed with an annular horizontally and radially extending thrust surface 125, while the shape of the thrust ring 126 is modified so as to have a rectangular contour in radial cross-section presenting a mating downwardly facing thrust surface 166. Also the thrust ring designated 166ᵃ may be provided with a collar 166ᵇ which projects between the clamp ring 135 and the conduit 112. This collar 166ᵇ, by reason of its non-corrodable composition, insures a free moving joint and serves to prevent the formation of corrosion on cooperative bearing surfaces of the ring 135 and the joint member 167. Otherwise the details of the joint remain the same as illustrated in FIG. 3 and are identified by the same reference characters plus 100 as 110, 111, etc. It will be observed that in this latter form of the invention, the conduit section 110, which is the section received by the train end valve, differs from the conduit section 10 only in the shape of the outwardly diverging end flange 118. The shape of the conduit section 110 is not altered and remains substantially the same as that of the conduit section 10.

It should be noted that in FIG. 2, the flexible joint between the conduit sections 10 and 11, 11 and 12, and 13 and 14 are identical. However, the environment of the joint existing between the sections 11 and 12 differs slightly from the others in that the radially and longitudinally diverging end flange 18 is formed on a separate attachment sleeve 67 instead of being formed directly on the end of the section 12. The sleeve 67 is threaded as at 68 on the end of the conduit section 12. It will be observed that the thrust ring 26 may be provided with an anti-friction collar 26ᵃ of non-corrosive metal as indicated at the right of FIG. 3 to prevent the formation of corrosion on the cooperating bearing surfaces of the clamp ring 35 and the conduit element 67.

I claim:

1. A flexible metallic conduit for connecting together train pipes of adjacent railway cars and comprising, in combination, two conduit sections arranged in end-to-end relation, one of said conduits being provided with a thrust flange having a terminal cylindrical outer surface and an inner frusto-conical face and the other conduit section being formed with a frusto-conical end face opposed to the frusto-conical inner face of said thrust flange and having an annular recess the outer wall of which defines a flange overlapping a portion of said cylindrical outer surface, sealing means interposed between the opposed end faces of said conduit sections and having sealing surfaces complemental to the opposed frusto-conical end faces of both conduit sections, and means cooperating with the frusto-conical inner face of said thrust flange for pressing said opposed ends of said conduit sections into self-aligning operative positions with capacity for free turning movement comprising a thrust ring positioned in said recess and having a frusto-conical face complemental to a radially outer marginal area of the frusto-conical inner face of said thrust flange at a location intermediate the vertical plane of said cylindrical outer surface and the said sealing means and has sealing contact with the radial outer edge of said sealing means, a second thrust ring complemental to an area of the outer face of said thrust flange at a location opposed to the first mentioned thrust ring, and a clamp ring engaging said second thrust ring and the outer cylindrical surface of said thrust flange and effective to hold the opposed conical faces of said conduit sections against relative axial movement independently of said sealing means.

2. The combination defined in claim 1 wherein the said thrust flange is additionally formed with an outer frusto-conical face and that the second mentioned thrust ring is of wedge-shape in cross-section and has a frusto-conical face complemental to and cooperating with the frusto-conical outer face of said thrust flange to facilitate pressing the opposed ends of the conduit sections into said self-aligning operating positions.

3. The combination structure of claim 2 wherein said sealing means is an assembly comprising a hollow elastomeric gasket element of V-shape cross-section and a metallic armor ring of V-shape configuration fitted into said gasket element; the armor ring being split transversely to provide it with yieldable end portions to facilitate insertion of said ring into the gasket and to permit radial expansion of said ring under pressure of fluid within the conduit structure.

4. The combination structure defined in claim 3 wherein said second mentioned thrust ring is made of non-corrosive anti-friction material and is provided with a collar portion interposed between a cylindrical outer surface of a joint member and said clamp ring.

5. The combination structure as defined in claim 1 wherein the outer surface of said thrust flange presents a flat face and the second mentioned thrust ring is of rectangular configuration positioned to bear against said flat surface of said thrust flange.

6. The combination structure defined in claim 5 wherein the thrust ring having a rectangular portion is provided with a collar interposed between a cylindrical outer surface of a joint member and said clamp ring.

(References on following page)

References Cited in the file of this patent

UNITED STATES PATENTS

| | | |
|---|---|---|
| 440,838 | Chapman | Nov. 18, 1890 |
| 590,342 | Smith | Sept. 21, 1897 |
| 1,015,904 | Niederlander et al. | Jan. 30, 1912 |
| 1,221,707 | Durbin | Apr. 3, 1917 |
| 1,938,829 | Hamer | Dec. 12, 1933 |
| 2,122,616 | Lamont | July 5, 1938 |
| 2,132,010 | Barry | Oct. 4, 1938 |
| 2,366,161 | Tweedale | Jan. 2, 1945 |
| 2,512,883 | Warren | June 27, 1950 |
| 2,520,896 | Smulski | Aug. 29, 1950 |
| 2,712,457 | Kimbro | July 5, 1955 |

FOREIGN PATENTS

| | | |
|---|---|---|
| 451,812 | Great Britain | Aug. 12, 1936 |
| 638,283 | Great Britain | June 7, 1950 |